United States Patent
Dawoud

(10) Patent No.: US 10,902,063 B2
(45) Date of Patent: *Jan. 26, 2021

(54) WILDCARD SEARCH IN ENCRYPTED TEXT

(71) Applicant: Skyhigh Networks, LLC, Campbell, CA (US)

(72) Inventor: Hani T. Dawoud, San Jose, CA (US)

(73) Assignee: Skyhigh Networks, LLC, Campbell, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/241,531

(22) Filed: Jan. 7, 2019

(65) Prior Publication Data

US 2019/0138556 A1 May 9, 2019

Related U.S. Application Data

(63) Continuation of application No. 14/734,880, filed on Jun. 9, 2015, now Pat. No. 10,176,207.

(51) Int. Cl.
| | | |
|---|---|---|
| *G06F 16/903* | (2019.01) | |
| *G06F 16/9032* | (2019.01) | |
| *G06F 17/30* | (2006.01) | |
| *G06F 21/60* | (2013.01) | |
| *G06F 21/62* | (2013.01) | |

(52) U.S. Cl.
CPC .... *G06F 16/9032* (2019.01); *G06F 17/30336* (2013.01); *G06F 21/602* (2013.01); *G06F 21/6227* (2013.01)

(58) Field of Classification Search
CPC ........... G06F 16/9032; G06F 17/30336; G06F 21/602; G06F 21/6227

USPC ................. 707/741, 758, 790, 803
See application file for complete search history.

(56) References Cited

U.S. PATENT DOCUMENTS

| | | |
|---|---|---|
| 8,930,691 B2 | 1/2015 | Kamara et al. |
| 9,047,480 B2 | 6/2015 | Kahol et al. |
| 9,454,673 B1 | 9/2016 | Sarukkai |

(Continued)

OTHER PUBLICATIONS

Li etal., "Fuzzy Keyword Search over Encrypted Data in Cloud Computing", IEEE INFOCOM 2010. downloading: https://ieeexplore.ieee.org/document/5462196/ (Year: 2010).*

(Continued)

*Primary Examiner* — Hares Jami
(74) *Attorney, Agent, or Firm* — Byrne Poh LLP

(57) ABSTRACT

A wildcard searchable encryption method enables wildcard search of encrypted text in a cloud-stored encrypted file. In some embodiments, the wildcard searchable encryption method is implemented in a network intermediary, such as a proxy server. The network intermediary encrypts files on behalf of a user or an enterprise destined to be stored on a cloud storage service. The wildcard searchable encryption method performs keyword pre-processing of the file to be encrypted to generate a set of keyword-wildcard combinations in plaintext for some or all of the keywords in the file. The processed file is encrypted using an exact match searchable encryption algorithm. As a result of the encryption process, a search index is generated to include the keyword-wildcard combinations. As thus configured, the wildcard searchable encryption method enables wildcard search of the encrypted text, such as searches for prefixes or suffixes of the keywords.

16 Claims, 8 Drawing Sheets

(56) References Cited

U.S. PATENT DOCUMENTS

| | | | |
|---|---|---|---|
| 9,679,160 | B1 | 6/2017 | Zhang |
| 9,760,637 | B2* | 9/2017 | Grubbs ............... H04L 63/0281 |
| 2005/0177554 | A1 | 8/2005 | Peltonen |
| 2007/0266037 | A1* | 11/2007 | Terry .................... G06F 3/0607 |
| 2009/0113213 | A1* | 4/2009 | Park .................... H04L 63/0281 |
| 2010/0211781 | A1 | 8/2010 | Auradkar |
| 2011/0004599 | A1 | 1/2011 | Deninger |
| 2011/0004607 | A1 | 1/2011 | Lokam |
| 2011/0119481 | A1 | 5/2011 | Auradkar |
| 2012/0324240 | A1 | 12/2012 | Hattori |
| 2013/0067226 | A1* | 3/2013 | Kunde ................ G06F 21/6227 713/168 |
| 2013/0091357 | A1 | 4/2013 | Moon |
| 2013/0148803 | A1 | 6/2013 | Jho |
| 2013/0159695 | A1 | 6/2013 | Chiueh |
| 2013/0262852 | A1 | 10/2013 | Roeder |
| 2013/0262863 | A1 | 10/2013 | Yoshino |
| 2013/0346424 | A1* | 12/2013 | Zhang .................. G06F 16/313 707/750 |
| 2014/0095889 | A1 | 4/2014 | Araki |
| 2014/0149435 | A1 | 5/2014 | Sisman |
| 2014/0214838 | A1 | 7/2014 | Hendrey |
| 2014/0280342 | A1* | 9/2014 | Litherland ............. G06F 16/22 707/780 |
| 2014/0355756 | A1 | 12/2014 | Iwamura |
| 2014/0359282 | A1 | 12/2014 | Shikfa |
| 2015/0039886 | A1* | 2/2015 | Kahol .................. H04L 9/0894 713/165 |
| 2015/0039887 | A1 | 2/2015 | Kahol et al. |
| 2015/0154418 | A1 | 6/2015 | Redberg |
| 2015/0356314 | A1* | 12/2015 | Kumar ................ G06F 16/2228 713/165 |

OTHER PUBLICATIONS

Gedam, "Fuzzy Keyword Search over Encrypted Data in Cloud Computing", Journal of Engineering Research and Application, 2014. Downloading: https://pdfs.semanticscholar.org/e14b/b18de34c12750da19844c628c332d9c7ce3a.pdf. (Year: 2014).*

Aswani et al. "Fuzzy Keyword Search over Encrypted Data Using Symbol-Based Trie-Traverse Search Scheme in Cloud Computing", Research Paper, Sep. 21, 2012, pp. 1-8.

Cash et al., "Dynamic Searchable Encryption in Very-Large Databases: Data Structures and Implementation", available at: http://www.internetsociety.org/sites/default/files/07_4_1.pdf, last accessed Feb. 26, 2014, pp. 1-32.

Cash et al., "Dynamic Searchable Encryption in Very-Large Databases: Data Structures and Implementation", in Network and Distributed System Security Symposium, NDDSS, vol. 14, Feb. 2014, pp. 1-32.

Cash et al., "Highly-Scalable Searchable Symmertric Encryption with Support for Boolean Queries", in the 33rd International Cryptology Conference, Aug. 2013, pp. 1-21.

Gedam et al., "Fuzzy Keyword search over Encrypted Data in Cloud computing", In the Yogeth K. Gedam Int. Jouranl of Engineering Research and Applications, vol. 4, Issue 7 (Version 3), www.ijera.com ISSN : 2248-9622, Jul. 2014, pp. 197-202.

Kamara, S., "Encrypted Search" Research Paper, Spring 2015, available online at: http://research.microsoft.com/en-us/um/people/snyk/pubs/esearch.pdf, last accessed Jun. 2015, pp. 1-7.

Li et al., "Fuzzy Keyword Search over Encrypted Data in Cloud Computing", in IEEE INFOCOM 2010, San Diego, CA, Mar. 15-19, 2010, available at: https://ieeexplore.ieee.org/documents/5462196., pp. 1-5.

Notice of Allowance dated Apr. 24, 2019 in U.S. Appl. No. 14/808,850, pp. 1-19.

Notice of Allowance dated Sep. 5, 2018 in U.S. Appl. No. 14/734,880, pp. 1-45.

Office Action dated Feb. 7, 2019 in U.S. Appl. No. 14/808,850, pp. 1-18.

Office Action dated Jul. 24, 2018 in U.S. Appl. No. 14/808,850, pp. 1-51.

Office Action dated Nov. 3, 2017 in U.S. Appl. No. 14/808,850, pp. 1-33.

Office Action dated Dec. 15, 2017 in U.S. Appl. No. 14/734,880, pp. 1-32.

* cited by examiner

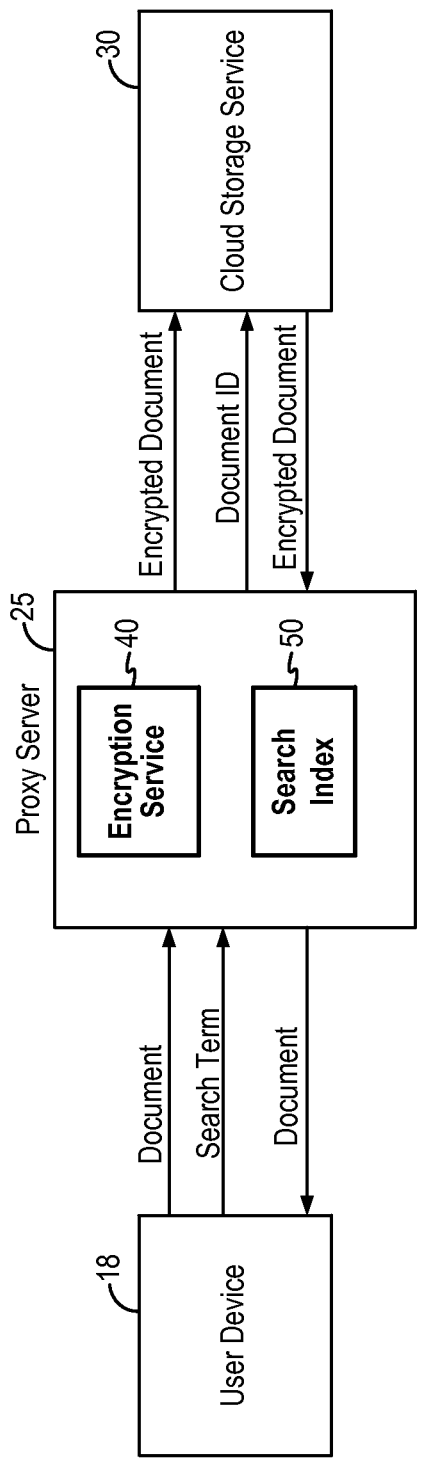
FIG. 4
FIG. 5
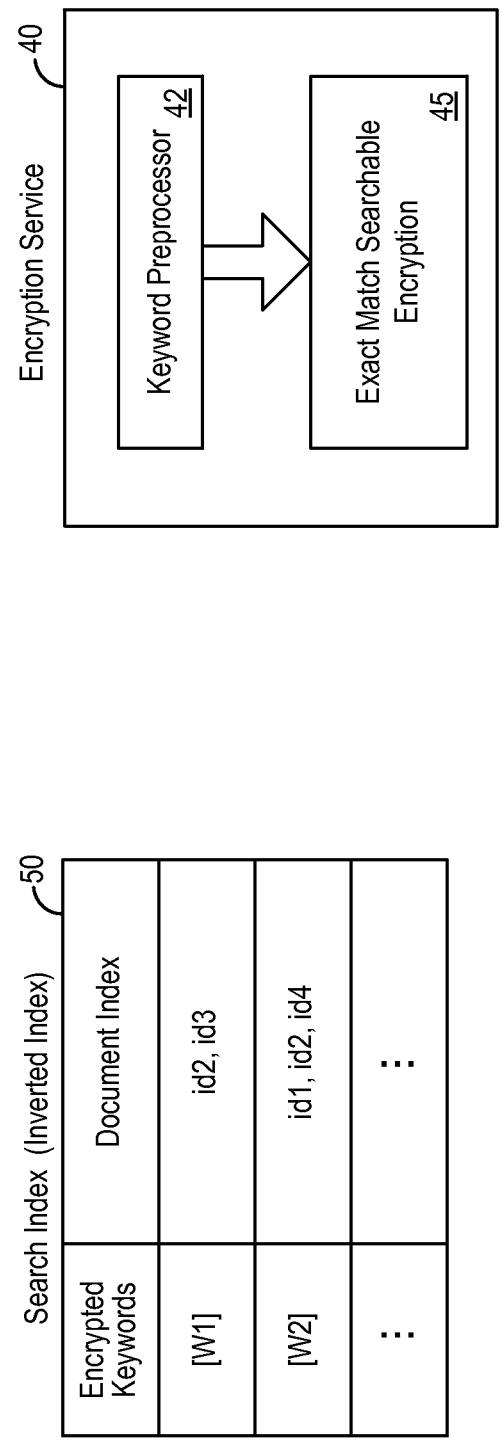
FIG. 6

WILDCARD SEARCH IN ENCRYPTED TEXT

CROSS-REFERENCE TO RELATED APPLICATION

This application is a continuation of U.S. patent application Ser. No. 14/734,880, filed Jun. 9, 2015, which is hereby incorporated by reference herein in its entirety.

TECHNICAL FIELD

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue. In particular, cloud-based data storage has also come into widespread use. With more and more user data and files being stored in cloud-based data storage, data security for data and files stored on the cloud-based storage data has become an important issue.

BRIEF DESCRIPTION OF THE DRAWINGS

Various embodiments of the invention are disclosed in the following detailed description and the accompanying drawings.

FIG. 4 illustrates the wildcard searchable encryption method implemented in a network intermediary in embodiments of the present invention.

FIG. 5 illustrates a configuration of the search index in some embodiments.

FIG. 6 is a block diagram of the encryption service 40 implementing the wildcard searchable encryption method in embodiments of the present invention.

DETAILED DESCRIPTION

Figure 1:
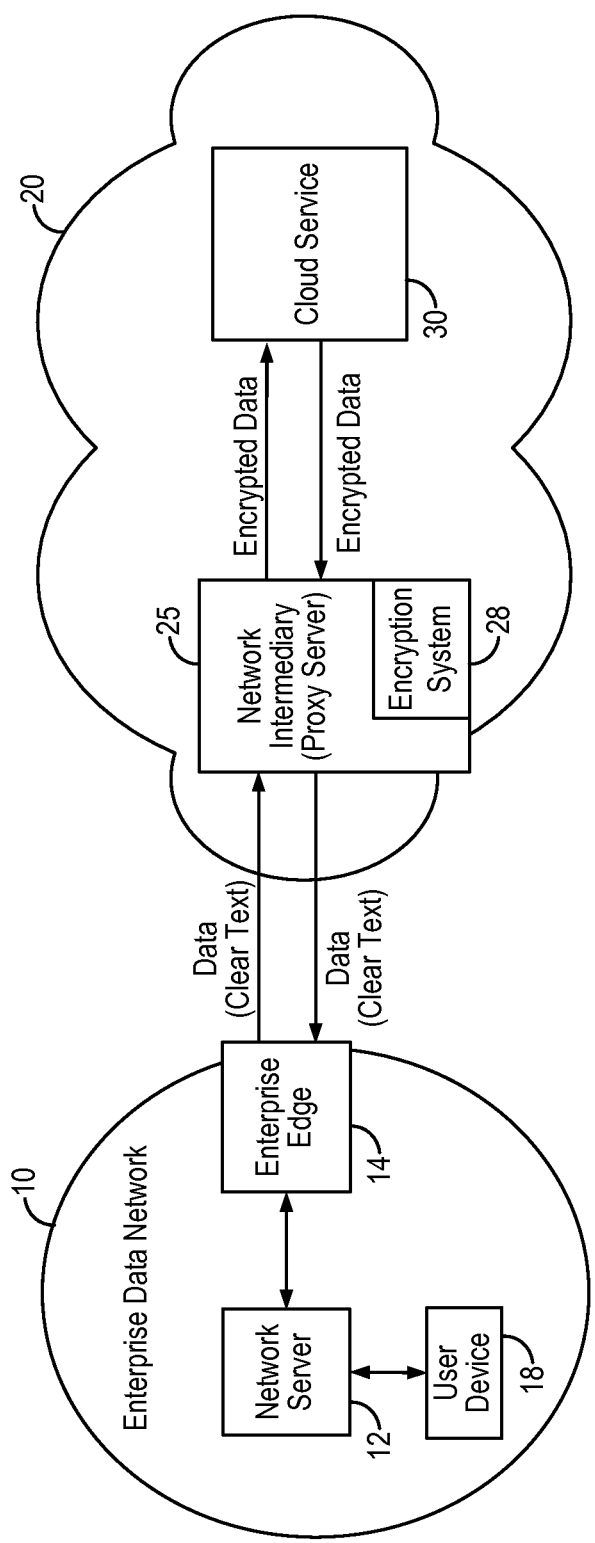
FIG. 1 is a block diagram illustrating a network intermediary implementing encryption of cloud data on behalf of an enterprise in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a wildcard searchable encryption method enables wildcard search of encrypted text in a cloud-stored encrypted file. In some embodiments, the wildcard searchable encryption method is implemented in a network intermediary, such as a proxy server. The network intermediary encrypts files on behalf of a user or an enterprise destined to be stored on a cloud storage service. The searchable encryption method performs keyword pre-processing of the file to be encrypted to generate a set of keyword-wildcard combinations in plaintext for some or all of the keywords in the file. The set of keyword-wildcard combinations enables wildcard searching of at least some or all of the keywords in the file. The set of keyword-wildcard combinations is appended to the file and encrypted together with the file using an exact match searchable encryption algorithm. As a result of the encryption process, a search index is generated to include the keyword-wildcard combinations. As thus configured, the wildcard searchable encryption method enables wildcard search of the encrypted text including searches for prefix or suffix of the keywords. In some embodiments, the wildcard searchable encryption method realize wildcard searching of encrypted text in cloud-stored encrypted files by using the search index stored on the network intermediary.

In the present description, the term "keyword" refers to any word in a document and can include one or more characters of the English alphabet (lower case and uppercase letters), numbers 0-9, punctuation symbols, alphabet and symbols of languages other than English, and other ASCII characters. In the present description, the term "wildcard" refers to a character that will match any character or sequence of characters in a search.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network redirects network traffic between a client device and a cloud-based service through a network intermediary. The client device may be situated within the enterprise data network or be associated with the enterprise. The network intermediary may provide monitoring and assessment of the enterprise's cloud usage. In some cases, the network intermediary is used to provide additional security function, such as file encryption for uploaded data. For instance, the network intermediary may be used to provide encryption of sensitive data to be stored in a cloud service provider.

FIG. 1 is a block diagram illustrating a network intermediary implementing encryption of cloud data on behalf of an enterprise in some embodiments. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as a cloud service provider 30, that are deployed on the public data network 20. Network traffic from the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device are intercepted by the network intermediary 25 before reaching the cloud service provider 30. In embodiments of the present invention, the network intermediary 25 performs encryption of the data before sending the data onto the cloud service. The cloud-based service may be a cloud storage service, customer relationship management (CRM) services, information technology (IT) services or other types of cloud services. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network.

In the following description, the term "data" will be used to refer to data or files or documents in any format that is being exchanged in the network environment described herein. In the present example, the cloud-based service 30 may be a cloud storage service, such as Box.com or collaboration services, such as Office 365. The cloud-based service 30 may also be a customer relationship management (CRM) service, information technology (IT) service or other types of cloud services.

In some embodiments, the network intermediary 25 performs encryption of data and files before sending the data and files onto the cloud storage service 30. Accordingly, in some embodiments, the network proxy server 25 includes an encryption system 28 which encrypts and decrypts file content based on one or more encryption algorithms. The content can be a file or list of words from the file. The encryption system 28 may utilize keys, algorithms, pseudo random number generators and encoding algorithms suitable for encrypting the files from the user device.

As thus configured, a user in an enterprise data network 10, wishing to use a cloud-based data storage service provider 30 for storing data or files, uses a computing device 18 to access the cloud storage service 30. The user's request is redirected to the network proxy server 25 acting as the network intermediary. The network proxy server 25 may be configured as reverse/forward proxies. Thus, requests and files from the user are intercepted by the network proxy server 25 before reaching the cloud storage service 30. The data or files of the user are sent to the network proxy server 25 in clear text or plaintext. The network proxy server 25 performs, among other things, encryption of the files before sending the encrypted files or data onto the cloud storage service for storage. In this manner, data security is ensured as files are stored on the cloud service provider 30 as encrypted files and any one accessing the files on the cloud service provider directly will only see encrypted text. When the file is to be retrieved from the cloud service provider 30, the network intermediary 25 retrieves the file and also decrypts the file. The decrypted file is then provided to the user device 18 through the enterprise data network 10. With the use of the network intermediary 25 including the encryption system 28, the enterprise makes use of cloud based services with the security of the cloud data and content being encrypted at rest.

While file-level encryption ensures data security, encryption prevents the stored files from being searched using the cloud service provider's native search routine. For example, cloud-based storage services typically provides search option where the stored files can be searched for keywords using the cloud service's native search routine and this search functionality will not work if the files are encrypted. Searchable encryption algorithms have been described which enables exact match searching in encrypted text. For example, Cash et al. described searchable encryption in the publications entitled "Highly-Scalable Searchable Symmetric Encryption with Support for Boolean Queries" and "Dynamic Searchable Encryption in Very-Large Databases: Data Structures and Implementation," published in CRYPTO 2013 and NDSS 2014, respectively, which publications are incorporated herein by reference in their entireties.

Figure 2:
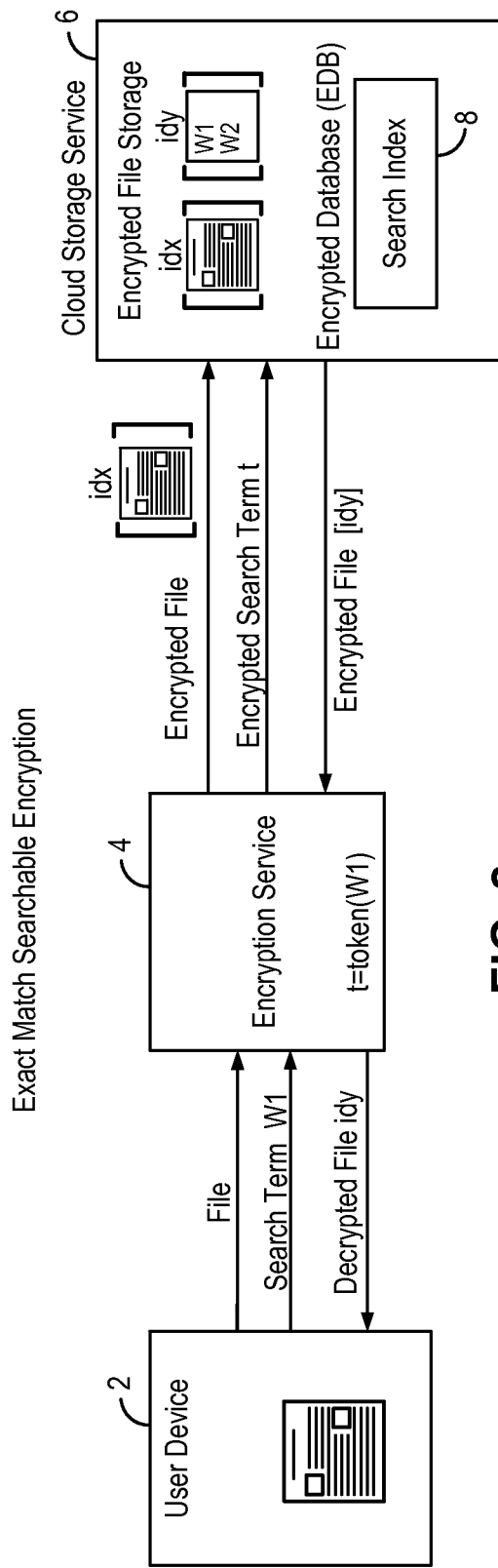
FIG. 2 illustrates the operation of an exact match searchable encryption algorithm in one example.

FIG. 2 illustrates the operation of an exact match searchable encryption algorithm in one example. Referring to FIG. 2, a user device 2 sends a file to be encrypted by an encryption service 4 implementing an exact match searchable encryption algorithm. The encryption service 4 encrypts the file and forwards the encrypted file to a cloud storage service 6 for storage. The encrypted files stored in the cloud storage service are indexed by a document index (or document ID), such as idx and idy. The encryption service 4 also generates an encrypted database (EDB) containing a search index 8 to enable the searching of the encrypted text in the encrypted files. The search index contains a mapping of encrypted keywords in the encrypted files to the document index. To search for a keyword in the encrypted file, the user device 2 sends a search term W1 to the encryption service 4. The encryption service 4 encrypts or tokenizes the search term W1 and generates a token t. The encryption service 4 sends the token t to the cloud storage service 6. The cloud storage service 6 can then use its native search routine to search for the token t in the encrypted files (such as idx and idy). In particular, the cloud storage service 6 searches for the token t in the search index 8. In the event that the token t is found in the search index, the cloud storage service 6 returns the indexed document (e.g. idy) to the encryption service 4 for decryption. The encryption service then provides the decrypted file to the user device 2.

Figure 3:
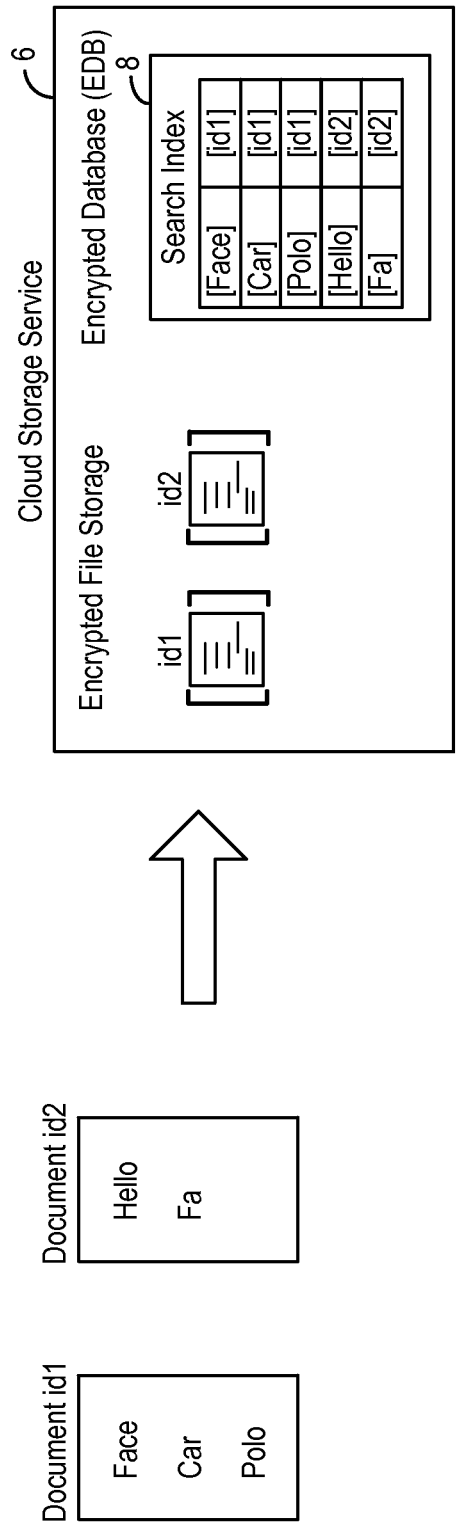
FIG. 3 further illustrates the operation of an exact match searchable encryption algorithm in some examples.

FIG. 3 further illustrates the operation of an exact match searchable encryption algorithm in some examples. In the present example, it is assumed that two documents are being encrypted by the exact match searchable encryption algorithm. The first document (document id1) includes the keywords "Face, Car and Polo" while the second document (document id2) includes the keywords "Hello and Fa". The exact match searchable encryption algorithm encrypts the two documents and the encrypted files id1 and id2 are stored in the encrypted file storage of the cloud storage service 6. In the present embodiment, a file or a keyword that is encrypted is illustrated as being enclosed in a square bracket "[ ]". As part of the encryption process, the encryption service generates a search index 8 which includes a mapping of encrypted keywords to document indices. For example, the encrypted keyword "[Face]" is mapped to document id1 in the search index while the encrypted keyword "[Hello]" is mapped to document id2 in the search index.

To search for a keyword in the encrypted documents, a search term is provided and the cloud service compares the encrypted search term with the encrypted keywords in the search index 8. A match is found only if there is an exact match between the encrypted search term and the encrypted keywords in the search index 8. When the exact match is found, the document index or indices are returned. In this case, because the encryption for the word "Face" is different from the encryption for the word "Fa", a search request for the search term "Fa" or "Fa*" (where "*" denotes wildcard) will return only document id2 and not document id1 as the encrypted search term for "Fa" will not match exactly the encrypted keyword for "Face" in the search index 8.

While searchable encryption algorithms have been described, these searchable encryption algorithms only allow for exact match searching. That is, the encrypted text can only be searched for an exact match search term. Wildcard searching, such as prefix or suffix searching, of encrypted text is not possible.

In embodiments of the present invention, a wildcard searchable encryption method uses keyword pre-processing to enable wildcard search of encrypted text in a cloud-stored encrypted file. FIG. 4 illustrates the wildcard searchable encryption method implemented in a network intermediary in embodiments of the present invention. Referring to FIG. 4, in the present embodiment, the wildcard searchable encryption method is implemented in a proxy server 25 serving as a network intermediary between a user device 18 and a cloud storage service 30. Files or documents sent by the user device 18 destined to the cloud storage service 30 are intercepted by the proxy server 25. The proxy server includes an encryption service 40 to encrypt files on behalf of the user device so that files or documents are stored on the cloud storage service 30 being encrypted at rest. In accordance with embodiments of the present invention, the encryption service 40 implements the wildcard searchable encryption method of the present invention. Furthermore, the encryption service 40 is configured to generate an encrypted database (EDB) containing a search index 50 to enable the searching of the encrypted text in the encrypted files.

In embodiments of the present invention, the encryption service 40 is configured to store a search index 50 on the proxy server 25, separate from the encrypted files which are being stored on the cloud storage service 30. In conventional searchable encryption algorithms, the search index is typically co-located with the encrypted files which in the present case is the cloud storage service 30. Searching of the encrypted files therefore takes place on the cloud storage service. However, the wildcard searchable encryption method of the present invention stores the encrypted database including the search index on the proxy server. In this manner, searching of the encrypted text is performed at the proxy server 25 using the search index 50 and the proxy server 25 retrieves the indexed document from the cloud storage service 30. Searching for files at the cloud storage service is therefore avoided.

More specifically, the user device 18 sends a document to be stored on the cloud storage service 30. The proxy server 25 intercepts the document and passes the document to the encryption service 40 for encryption. The encryption service 40 encrypts the document and generates or updates the search index 50 as a result of encrypting the document. The encrypted document is then sent to the cloud storage service 30 for storage. FIG. 5 illustrates a configuration of the search index in some embodiments. Referring to FIG. 5, the search index 50 includes a mapping of encrypted keywords to document indices. That is, the search index includes, for each encrypted keyword ([W1], [W2], . . . ) in the encrypted documents, a list of document indices identifying the documents containing the keyword. For example, for encrypted keyword [W1], the search index 50 indicates the documents id2 and id3 contain the keyword W1. For encrypted keyword [W2], the search index 50 indicates the documents id1, id2 and id4 contain the keyword W2. Each encrypted keyword may be associated with one or more documents.

When the user wishes to perform a search of the encrypted files stored on the cloud storage service 30, the user device 18 transmits a search term which is intercepted by the proxy server 25. The encryption service 40 encrypts the search term and searches in the search index 50 for the encrypted search term. When the encrypted search term is matched exactly to an encrypted keyword in the search index 50, the document index (or indices) associated with the matched encrypted keyword is retrieved and the document index or document ID is sent to the cloud storage service 30 to retrieve the document. The encrypted document is returned to the proxy server 25. The encryption service 40 decrypts the document and provides the decrypted document to the user device 18 as the search result.

In order to support wildcard searching of the encrypted text, the encryption service 40 implements the wildcard searchable encryption method of the present invention. FIG. 6 is a block diagram of the encryption service 40 implementing the wildcard searchable encryption method in embodiments of the present invention. Referring to FIG. 6, the encryption service 40 includes a keyword preprocessor module 42 configured to perform keyword pre-processing of the file to be encrypted to generate a set of keyword-wildcard combinations in plaintext for some or all of the keywords in the file. The set of keyword-wildcard combinations enables wildcard searching of at least some or all of the keywords in the file. The set of keyword-wildcard combinations is appended to the file to generate a processed file. The encryption service 40 further includes an exact match searchable encryption module 45 configured to encrypt the processed file using an exact match searchable encryption algorithm. Exact match searchable encryption algorithms are known and examples of exact match searchable encryption algorithms are described in the aforementioned papers by Cash et al.

Figure 7:
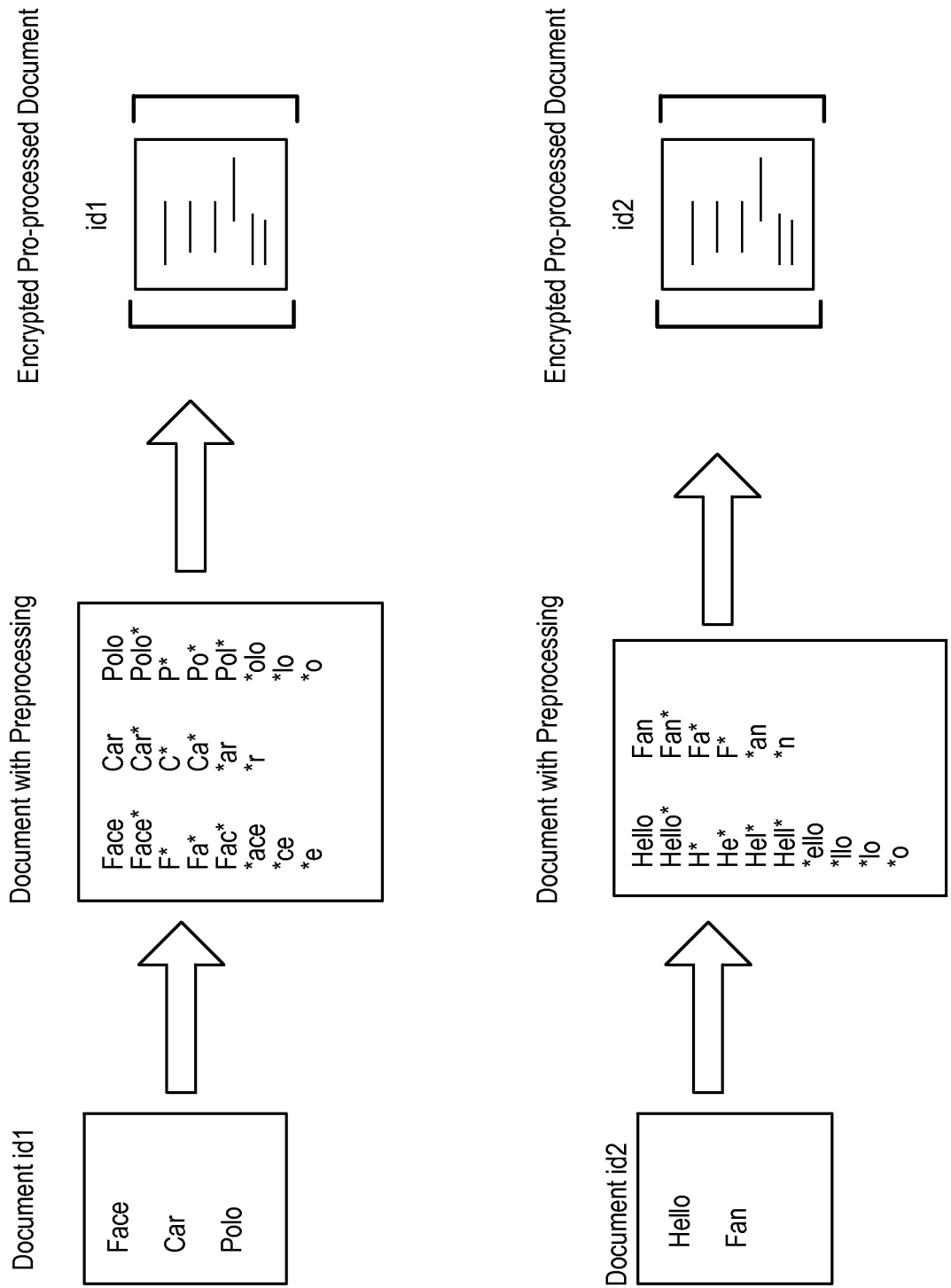
FIG. 7 illustrates the operation of the keyword preprocessor module in some examples.

More specifically, the keyword preprocessor module 42 parses the document to be encrypted and for at least some or all keywords in the document, the keyword preprocessor module 42 generates a set of keyword-wildcard combinations in plaintext for each keyword to enable wildcard searching of the keyword. In the present description, wildcard search of a keyword includes prefix search and/or suffix search of the keyword. For each keyword to be processed, the keyword preprocessor module 42 generates keyword-wildcard combinations including the leading one or more characters of the keyword, forming the prefixes of the keyword with the remaining character(s) being a wildcard. The keyword preprocessor module 42 may further generate keyword-wildcard combinations including the trailing one or more characters of the keyword, forming the suffixes of the keyword with the remaining character(s) being a wildcard. As a result, a set of keyword-wildcard combinations in plaintext for a keyword is generated to enable prefix or suffix search of the keyword. The set of keyword-wildcard combination for the subject keywords are appended to the document in plaintext. FIG. 7 illustrates the operation of the keyword preprocessor module in some examples. Referring to FIG. 7, a document id1 includes the keywords "Face," "Car," and "Polo" and a document id2 includes the keywords "Hello" and "Fa." In the present embodiment, the keyword preprocessing module processes the documents id1 and id2 to generate processed documents including keyword-wildcard combinations forming the prefixes and the suffixes of the keywords.

For example, for document id1, the keyword preprocessor module generates all the keyword-wildcard combinations forming prefixes of the keyword "Face". Thus, the keywords "Face*", "F*", "Fa*" and "Fac*" are generated. Furthermore, the keyword preprocessor module 42 generates all the keyword-wildcard combinations forming suffixes of the keyword "Face". Thus, the keywords "*ace", "*ce" and "*e" are generated. The same processing is applied to the keywords Car and Polo in document id1. The processed document includes the original keywords and the set of keyword-wildcard combinations. The entire processed document is encrypted using an exact match searchable encryption algorithm 45. In a similar manner, the keyword preprocessor module 42 generates the keyword-wildcard combinations forming prefixes and suffixes of the keywords "Hello" and "Fan" in document id2. The document id2 is also then encrypted using the exact match searchable encryption algorithm 45.

Figure 8:
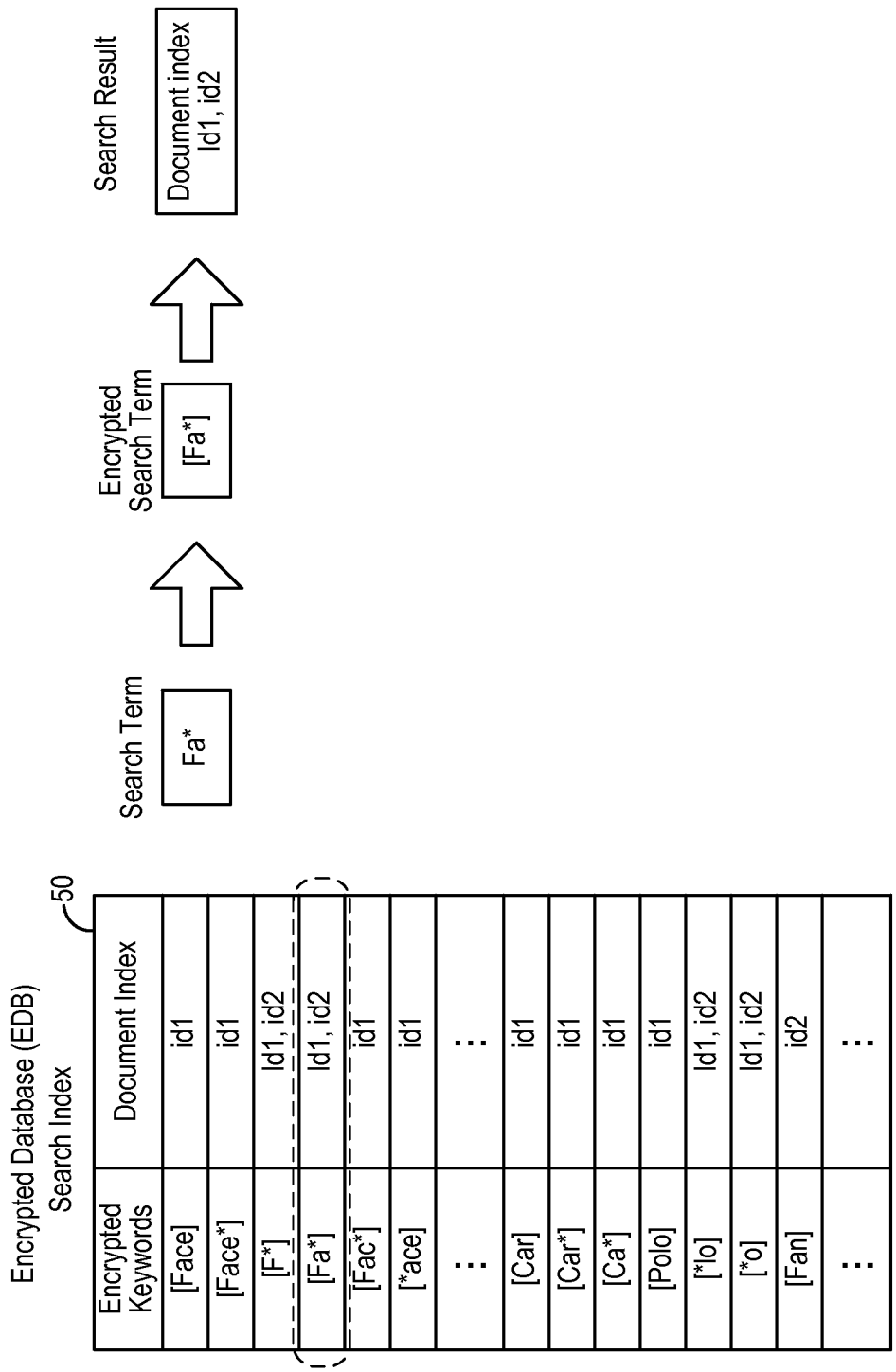
FIG. 8 illustrates the search index generated for the documents in FIG. 7.

With documents id1 and id2 thus encrypted, the encryption service 40 generates the search index 50 to include the mapping of encrypted keywords in the processed files to the document ID or document index of the processed file. FIG. 8 illustrates the search index generated for the documents in FIG. 7. With documents id1 and id2 thus pre-processed, the documents in plaintext include the keywords and all the associated keyword-wildcard combinations. After encryption, the search index is generated to include encrypted keywords from the original documents and encrypted keyword-wildcard combinations added by the keyword pre-processing. The encrypted keywords and keyword-combinations are mapped to the associated document ID in the search index 50. For example, the search index 50 includes an entry for the encrypted keyword [Face] mapped to document index id1. The search index 50 further includes an entry for the encrypted keyword [Fa*] mapped to both documents id1 and id2.

With the search index 50 thus generated to include encrypted keyword-wildcard combinations, wildcard search of the original keywords in the encrypted documents is enabled. For example, to search for all documents containing a word with the prefix "Fa", a search term for the prefix "Fa*" is provided. The encryption service 40 generates the encrypted search term [Fa*]. In the search index, the encrypted search term [Fa*] maps to documents id1 and id2. The proxy server 25 will then fetch the documents id1 and id2 from the cloud storage service as the search result.

In the instructive to note that without the pre-processing performed by the keyword preprocessor module, the search index 50 would not have contained the search term "Fa*" and a search of the term "Fa*" will only return document id2 containing the keyword "Fa" and not document id1 containing the keyword "Face" as the encryption for "Fa" and "Face" is different and the search index does not map the document id1 containing the keyword "Face" to the encrypted keyword "Fa" contained in document id2.

Figure 9:
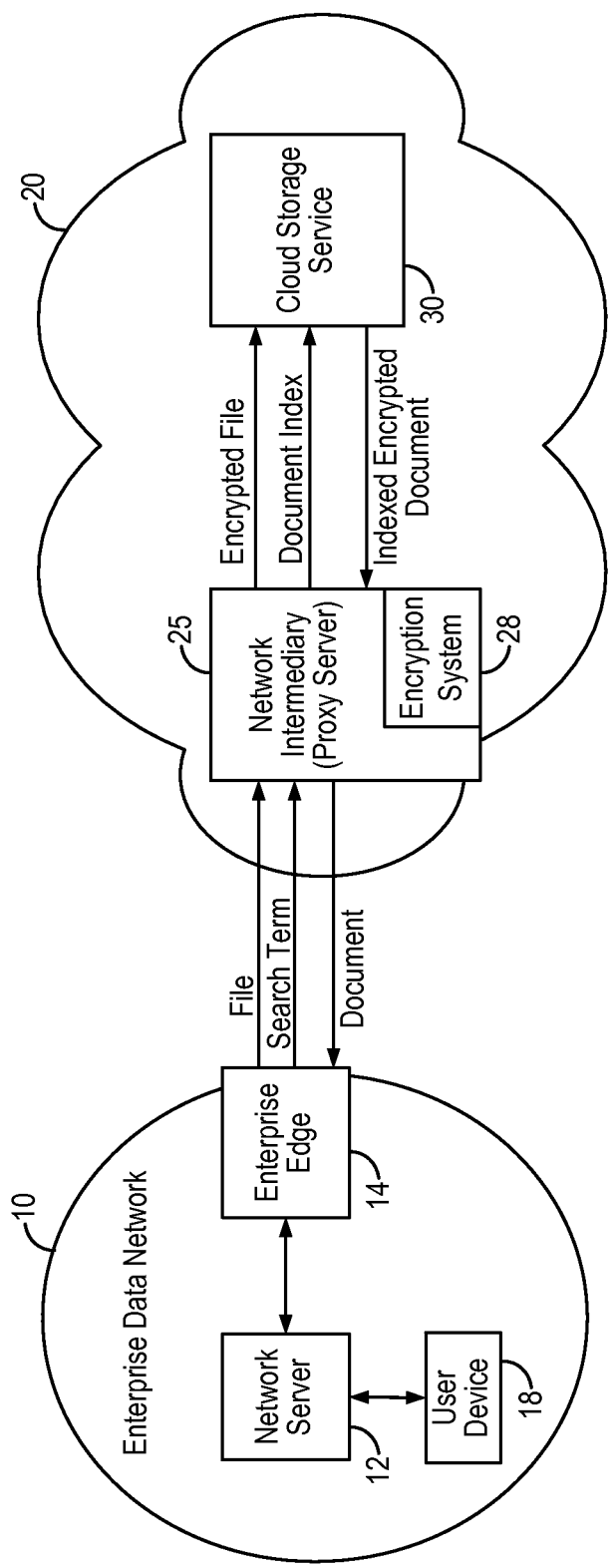
FIG. 9 is a block diagram illustrating a network intermediary implementing the wildcard searchable encryption of cloud data on behalf of an enterprise in some embodiments.

In embodiments of the present invention, the wildcard searchable encryption method is employed by an enterprise to perform encryption of the enterprise's cloud stored data so that users of the enterprise can perform wildcard search of the cloud stored data. FIG. 9 is a block diagram illustrating a network intermediary implementing the wildcard searchable encryption of cloud data on behalf of an enterprise in some embodiments. Referring to FIG. 9, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as cloud storage service 30, that are deployed on the public data network 20. Network traffic form the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. The network intermediary 25 may be configured as reverse/forward proxies. Thus, requests and data from the user device are intercepted by the network intermediary 25 before reaching the cloud service provider 30. In embodiments of the present invention, the network intermediary 25 performs encryption of data and files before sending the data and files onto the cloud storage service 30. The network proxy server 25 includes an encryption system 28 which encrypts and decrypts file content using the wildcard searchable encryption method of the present invention. In embodiments of the present invention, the network proxy server 25 implements the wildcard searchable encryption method 100 described in the flowchart of FIG. 10.

Figure 10:
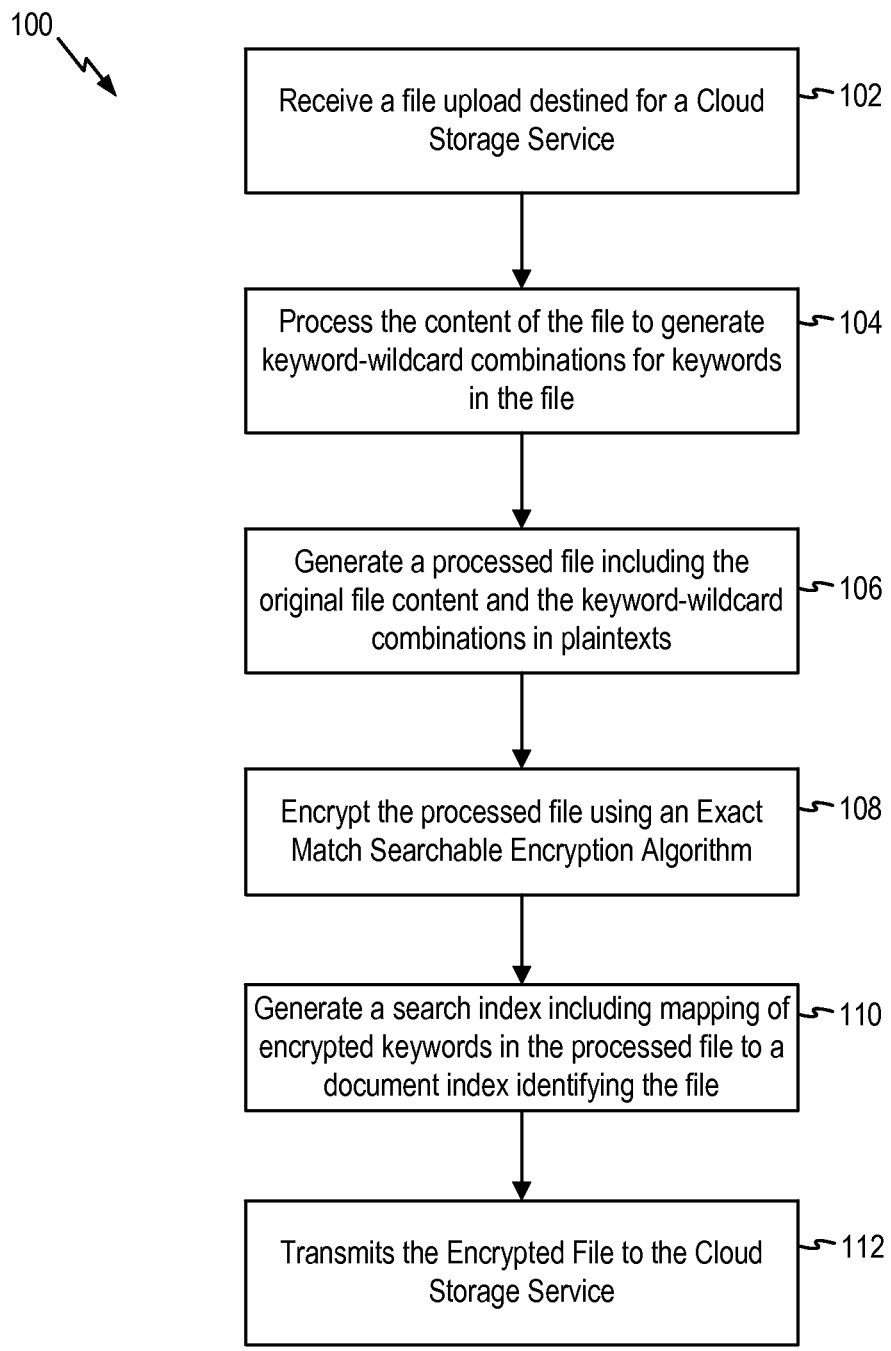
FIG. 10 is a flowchart illustrating the wildcard searchable encryption method which can be implemented in a proxy server in embodiments of the present invention.

Referring to FIGS. 9 and 10, the wildcard searchable encryption method 100 starts when a file upload destined for a cloud storage service is received at the proxy server 25 (102). The method 100 then processes the content of the file to generate keyword-wildcard combinations in plaintext for some or all of the keywords in the file (104). The keyword-wildcard combinations may include prefix combinations of the keywords and/or suffix combinations of the keywords, as described above. The method 100 generates a processed file including the original file content and the keyword-wildcard combinations in plaintext attached or appended thereto (106). Furthermore, the method 100 encrypts the processed file using an exact match searchable encryption algorithm (108). The method 100 further generates or updates a search index stored in the proxy server 25 (110). The method 100 stores in the search index a mapping of the encrypted keywords of the processed file to a document index identifying the file being encrypted. More specifically, the search index includes the encrypted keywords in the original content of the processed file and the encrypted keyword-wildcard combinations added to processed file from the pre-processing step. Finally, the method 100 transmits the encrypted file to the cloud storage service 30 for storage (112).

Figure 11:
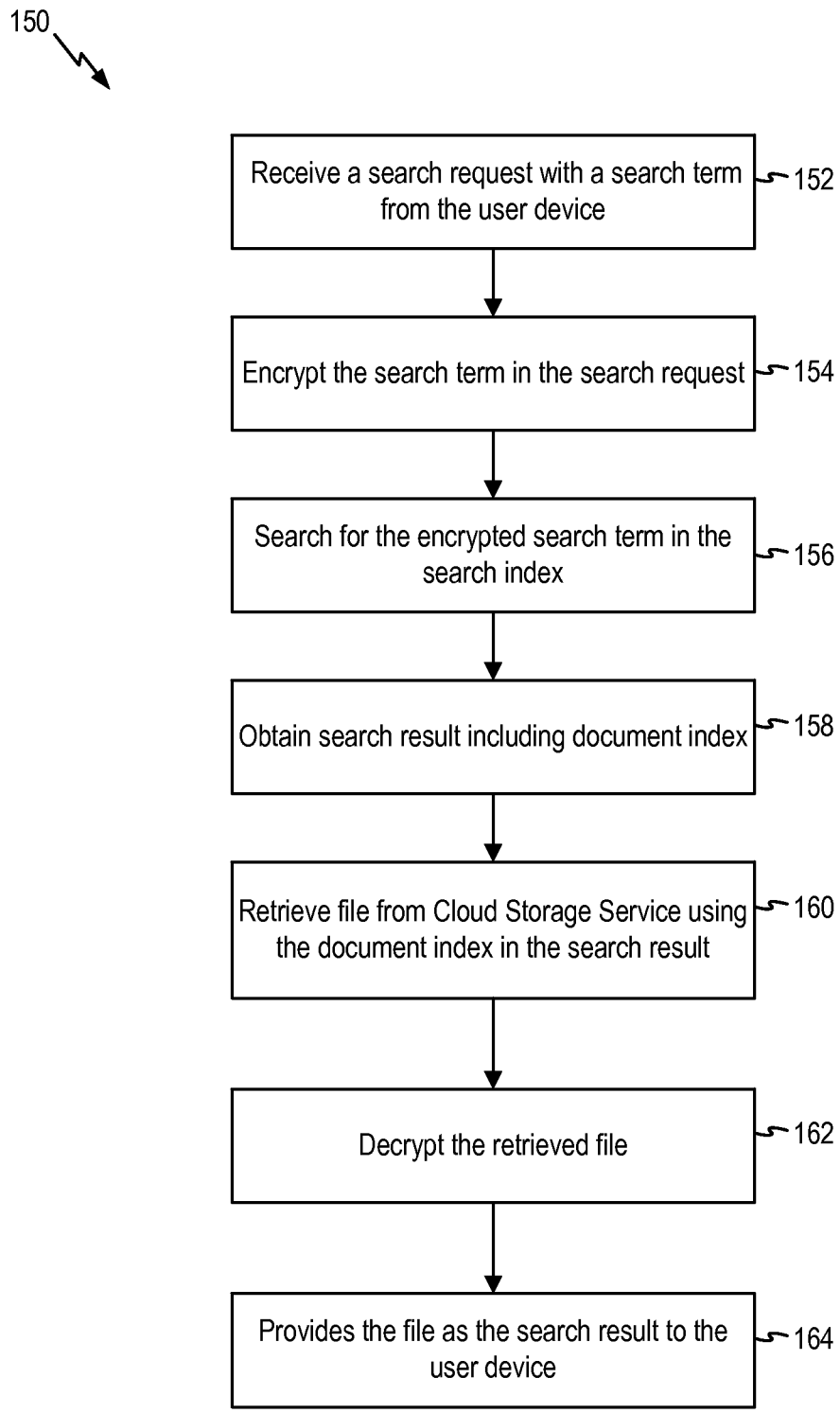
FIG. 11 is a flowchart illustrating a method for executing a search using the proxy server of FIG. 9 in embodiments of the present invention.

FIG. 11 is a flowchart illustrating a method for executing a search using the proxy server of FIG. 9 in embodiments of the present invention. Referring to FIGS. 9 and 11, a method 150 provides the process for executing a search of a cloud-stored encrypted file using the proxy server 25 including the encryption system 28. The method 150 receives a search request with a search term at the proxy server 25 from the user device 18 (152). In particular, the user device executes a search request for a file that is stored on the cloud storage service. The user device's search request is intercepted by the network proxy server. Accordingly, the search request is received by the method 150 at the network proxy server 25.

Upon receiving the search request, the method 150 encrypts the search term in the search request (154). The search term is encrypted using the same encoding algorithm used previously to encrypt the encrypted file. The method 150 then searches for the encrypted search term in the search index stored on the proxy server 25 (156). At 158, the method 150 receives the search result in response to the encrypted search term being a match to the encrypted keywords in the search index. In particular, one or more document indices associated with the matched encrypted search term is obtained from the search index. In other cases, when no match is found, the search result is nil and no document index is returned. At 160, the method 150 retrieves the encrypted file from the cloud storage service using the document index in the search result. The network proxy server 25 decrypts the file using the encryption algorithm previously used (162). The decoded or unencrypted file is then provided to the user device (164).

In the above-described embodiments, the set of keyword-wildcard combinations is appended to the file and encrypted together with the file using an exact match searchable encryption algorithm. The set of keyword-wildcard combinations can be appended to the head or to the tail of the original file. The exact location where the set of keyword-wildcard combination is being appended or attached in not critical to the practice of the present invention.

In the above-described embodiments, the wildcard searchable encryption method is implemented in a network intermediary. In other embodiments, the wildcard searchable encryption method can be implemented in a network server which communicates with a cloud service without a network intermediary. The search index may be stored on the network server while the encrypted files are stored on the cloud service. In some embodiments, the wildcard searchable encryption method may be implemented as an agent on a user device to process a file to include the set of keyword-wildcard combination so as to enable wildcard searching of the encrypted text.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for wildcard searchable encryption of cloud stored data, comprising:

generating, using a hardware processor, a plurality of keyword-wildcard combinations for at least one keyword in the file;

generating a processed file including content of the file and the plurality of keyword-wildcard combinations;

encrypting the processed file using an exact match searchable encryption algorithm to form an encrypted file;

encrypting the at least one keyword to form at least one encrypted keyword;

encrypting the plurality of keyword-wildcard combinations to form encrypted keyword-wildcard combinations;

generating a search index using the hardware processor and including a mapping of encrypted keywords of the processed file to a document index identifying the file, the encrypted keywords of the processed file including the at least one encrypted keyword and the encrypted keyword-wildcard combinations; and transmitting the encrypted file to a cloud storage service.

2. The method of claim 1, wherein generating, using the hardware processor, the plurality of keyword-wildcard combinations comprises:

generating, using the hardware processor, the plurality of keyword-wildcard combinations in plaintext for some or all words in the file.

3. The method of claim 1, wherein generating, using the hardware processor, the plurality of keyword-wildcard combinations comprises:

processing the content of the file to generate a plurality of prefix combinations in plaintext for the at least one of the keyword of the file.

4. The method of claim 3, wherein processing the content of the file to generate a plurality of prefix combinations in plaintext for the at least one keyword of the file comprises:
processing the content of the file to generate the plurality of prefix combinations for a keyword including one or more leading characters of the keyword forming prefixes of the keyword, one or more remaining characters being a wildcard.

5. The method of claim 1, wherein generating, using the hardware processor, the plurality of keyword-wildcard combinations comprises:
processing the content of the file to generate a plurality of suffix combinations in plaintext for the at least one keyword of the file.

6. The method of claim 5, wherein processing the content of the file to generate a plurality of suffix combinations in plaintext for the at least one keyword of the file comprises:
processing the content of the file to generate the plurality of suffix combinations for a keyword including one or more trailing characters of the keyword forming suffixes of the keyword, one or more remaining characters being a wildcard.

7. The method of claim 1, wherein generating a processed file including the content of the file and the plurality of keyword-wildcard combinations comprises:
appending the plurality of keyword-wildcard combinations in plaintext to the tail of the content of the original file.

8. The method of claim 1, further comprising:
receiving, using the hardware processor, a search request with a search term;
encrypting the search term in the search request using the exact match searchable encryption algorithm to form an encrypted search term;
searching for the encrypted search term in the search index;
receiving a search result from the search index in response to the encrypted search term matching an encrypted keyword in the search index, the search result comprising a document index associated with the encrypted keyword;
retrieving the encrypted file from the cloud storage service using the document index in the search result;
decrypting the encrypted file retrieved from the cloud storage to form a decrypted file; and
providing the decrypted file as the search result.

9. A system for wildcard searchable encryption of cloud stored data, comprising:
a memory; and
a hardware processor coupled to the memory, wherein the hardware processor is configured to:
generate a plurality of keyword-wildcard combinations for at least one keyword in the file;
generate a processed file including content of the file and the plurality of keyword-wildcard combinations;
encrypt the processed file using an exact match searchable encryption algorithm to form an encrypted file;
encrypt the at least one keyword to form at least one encrypted keyword;
encrypt the plurality of keyword-wildcard combinations to form encrypted keyword-wildcard combinations;
generate a search index including a mapping of encrypted keywords of the processed file to a document index identifying the file, the encrypted keywords of the processed file including the at least one encrypted keyword and the encrypted keyword-wildcard combinations; and
transmit the encrypted file to a cloud storage service.

10. The system of claim 9, wherein in generating the plurality of keyword-wildcard combinations, the hardware processor is also configured to:
generate the plurality of keyword-wildcard combinations in plaintext for some or all words in the file.

11. The system of claim 9, wherein in generating the plurality of keyword-wildcard combinations, the hardware processor is also configured to:
process the content of the file to generate a plurality of prefix combinations in plaintext for the at least one of the keyword of the file.

12. The system of claim 11, wherein in processing the content of the file to generate a plurality of prefix combinations in plaintext for the at least one keyword of the file, the hardware processor is also configured to:
process the content of the file to generate the plurality of prefix combinations for a keyword including one or more leading characters of the keyword forming prefixes of the keyword, one or more remaining characters being a wildcard.

13. The system of claim 9, wherein in generating the plurality of keyword-wildcard combinations, the hardware processor is also configured to:
process the content of the file to generate a plurality of suffix combinations in plaintext for the at least one keyword of the file.

14. The system of claim 13, wherein in processing the content of the file to generate a plurality of suffix combinations in plaintext for the at least one keyword of the file, the hardware processor is also configured to:
process the content of the file to generate the plurality of suffix combinations for a keyword including one or more trailing characters of the keyword forming suffixes of the keyword, one or more remaining characters being a wildcard.

15. The system of claim 9, wherein in generating a processed file including the content of the file and the plurality of keyword-wildcard combinations, the hardware processor is also configured to:
append the plurality of keyword-wildcard combinations in plaintext to the tail of the content of the original file.

16. The system of claim 9, wherein the hardware processor is also configured to:
receive a search request with a search term;
encrypt the search term in the search request using the exact match searchable encryption algorithm to form an encrypted search term;
search for the encrypted search term in the search index;
receive a search result from the search index in response to the encrypted search term matching an encrypted keyword in the search index, the search result comprising a document index associated with the encrypted keyword;
retrieve the encrypted file from the cloud storage service using the document index in the search result;
decrypt the encrypted file retrieved from the cloud storage to form a decrypted file; and
provide the decrypted file as the search result.

* * * * *